June 24, 1969 L. F. FRANK 3,451,752
COMPACT DOCUMENT COPIER
Filed June 8, 1966 Sheet 1 of 6

LEE F. FRANK
INVENTOR.

BY

ATTORNEYS

LEE F. FRANK
INVENTOR.

BY

ATTORNEYS

United States Patent Office 3,451,752
Patented June 24, 1969

3,451,752
COMPACT DOCUMENT COPIER
Lee F. Frank, Rochester, N.Y., assignor to Eastman Kodak Company, Rochester, N.Y., a corporation of New Jersey
Filed June 8, 1966, Ser. No. 556,107
Int. Cl. G03g 15/04
U.S. Cl. 355—8                             7 Claims

ABSTRACT OF THE DISCLOSURE

A document copier of the xerographic type wherein an optical system and xerographic charging, toning and fusing means are carried on a common reciprocatable member. The member is simultaneously traversed across a document and an image-receiving sheet to produce a fully developed, right-reading, reproduction of the document on the image-receiving sheet.

---

This invention relates to optical systems for projecting at unit magnification from an original such as a document to a photosensitive sheet.

The primary object of the invention is to provide a compact copier. A preferred embodiment of the invention introduces exceptionally high optical efficiency in a manner which constitutes a special embodiment of the highly efficient systems described in my co-filed application Ser. No. 556,032, "Efficient Optical System."

It is a further object of the invention to provide a document copier for xerographic printing onto a sheet of photoconductive material, the whole instrument being smaller than a desk drawer. The principle of the invention can be directly applied to a copier built into a desk drawer, but is here described in terms of a copier placed on top of a desk or table.

According to the invention, a document to be copied is placed under an optical unit and a sensitive sheet is placed above the part of the unit which, because of the way it moves, is termed a "drawer." A transverse slit in the bottom of the "drawer" acts as the exposure or object gate and through this gate the document is illuminated. By means of an optical system in the drawer, this light is focused on an image gate in the top of the drawer and through this gate exposes a sensitive sheet. As the drawer is moved, the document and the sensitive sheet are held stationary. The line of light falling on the document scans the document and at the same time the image scans the sensitive sheet. The optical system is such that there is a right-reading image on the sensitive sheet, when both the document and the sensitive sheet face their respective gates.

Since the motion of the document and receiving sheet (relative to the scanning gates) is in the same direction, the system is said to be in the "co-current" scanner category as distinguished from "counter-current" scanners.

According to a preferred embodiment of the invention, the drawer carries with it a corona discharge device located adjacent to the image gate and at the side of it which passes over the conductive sheet immediately ahead of the image gate, as the drawer is moved during exposure.

The optical system could be used with precharged paper, but this arrangement with the corona discharge wire carried by the drawer, is one of the factors which contributes to the overall compactness.

After exposure, the paper may be developed in a separate unit, but in the preferred embodiments of the invention, the drawer also carries a developing station which may be in the form of a magnetic brush or liquid applicator and in some cases also a fusing station such as an infrared radiation station or a heated roller.

These preferred embodiments which include complete charging, exposing, developing and fusing units, can take several forms. In one form the document and sensitive sheet are put in position and the drawer with all of the units moved in one direction, e.g., "pulled out." At this point one has a complete print and the drawer is "pushed in" or allowed to move in to the closed position to be ready to make another print.

In another form, the drawer is pulled out first and then the charging, exposing, developing and focusing units turned on as the drawer moves at a constant speed to the closed position.

In still another embodiment, the charging and exposing are done during the closing of the drawer, but the final closing motion brings a magnetic brush up into contact with the exposed paper, and the paper is moved past the drum and a fusing station. In this case, the developing is subsequent to the opening and closing of the drawer. In all cases, suitable electrical circuitry is provided to turn on the units at the proper time in the cycle.

The optical system carried in the drawer includes a dihedral reflector immediately above the object gate. Light from the document is reflected by one surface of the reflector horizontally into a concave mirror or other reflecting objective which reflects the light back to the upper surface of the dihedral reflector and thence through the image gate into focus on the sensitive paper.

According to a preferred embodiment of the invention, plane mirrors are positioned parallel to each other and symmetrically above and below the optic axis of the reflecting objective, which optic axis passes through the dihedral edge of the dihedral reflector. These plane mirrors, or at least one of them, will receive additional light reflected by the lower face of the dihedral reflector and reflect this additional light to the reflecting objective. The returning additional light is then reflected by the other of the plane reflectors to the upper face of the dihedral reflector and thence into focus at the image plane increasing the amount of image light two- or threefold.

The invention and the advantages thereof will be fully understood from the following description when read in connection with the accompanying drawings, in which.

Figure 5:
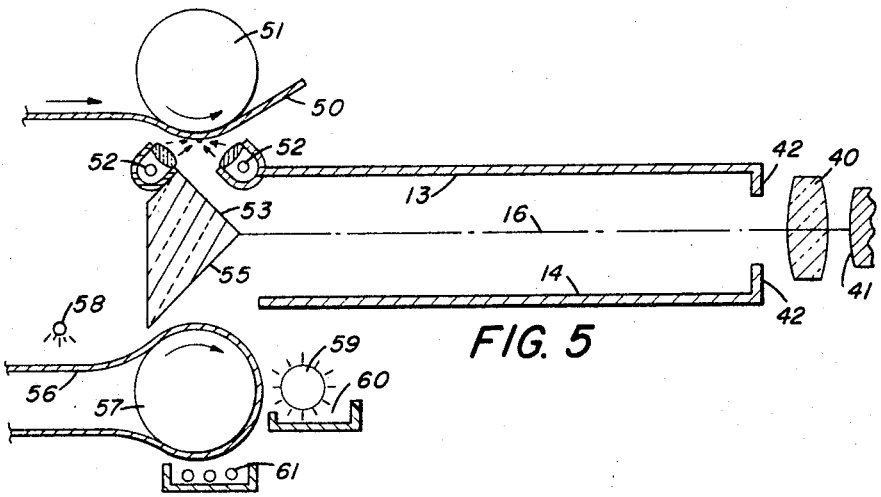
Figure 6:
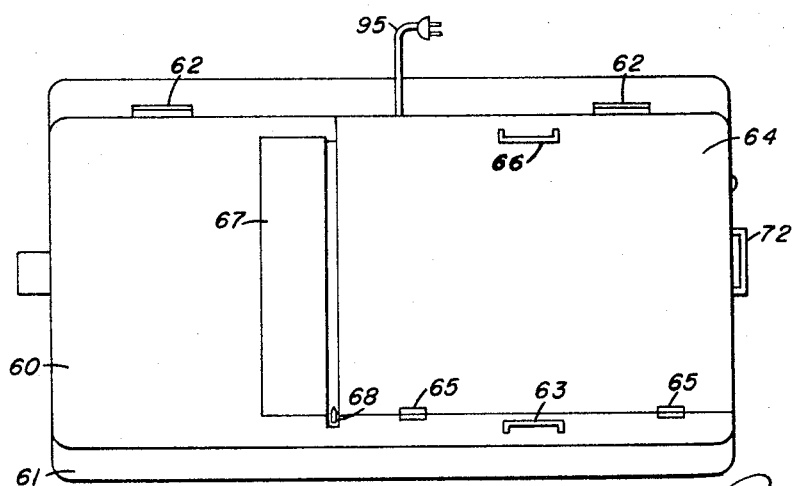
Figure 7:
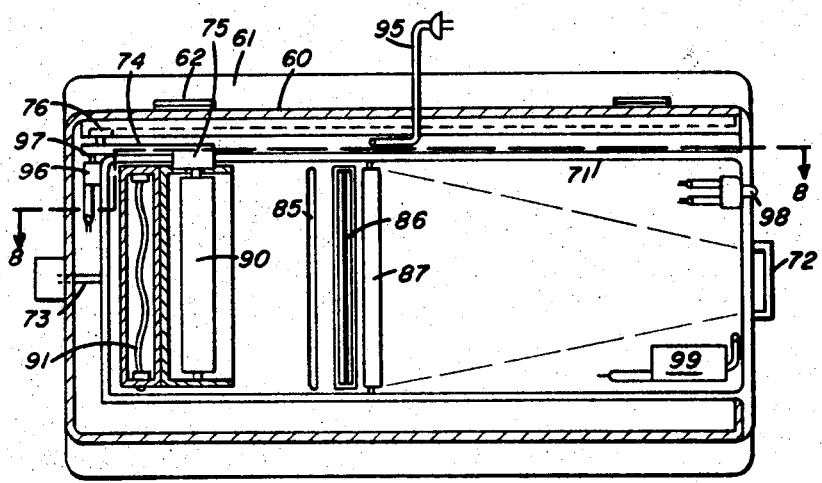

FIG. 5 schematically illustrates how such a system can be used as a "co-current" scanner.

FIGS. 6 through 9 are respectively a top view, a partly cut away top view, a vertical section and an end view of a preferred embodiment of the invention.

Figure 10:
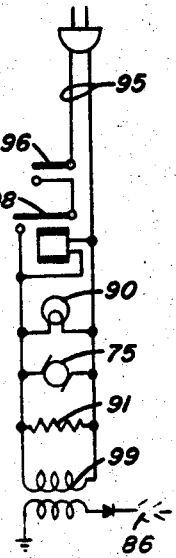
Figure 8:
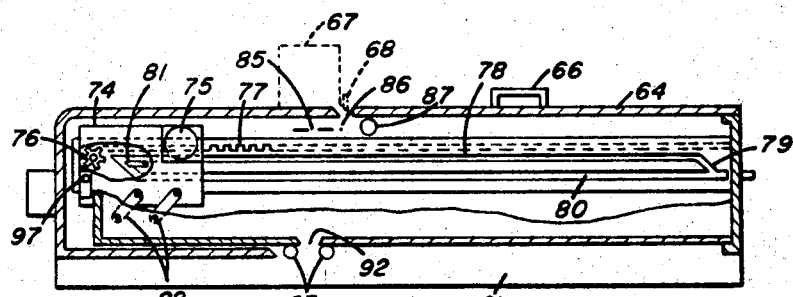
Figure 9:
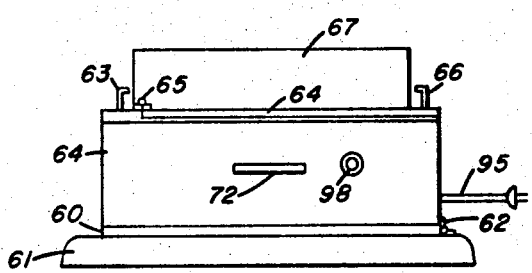

FIG. 10 shows the wiring diagram for the embodiment shown in FIGS. 6 through 9.

Figure 11:
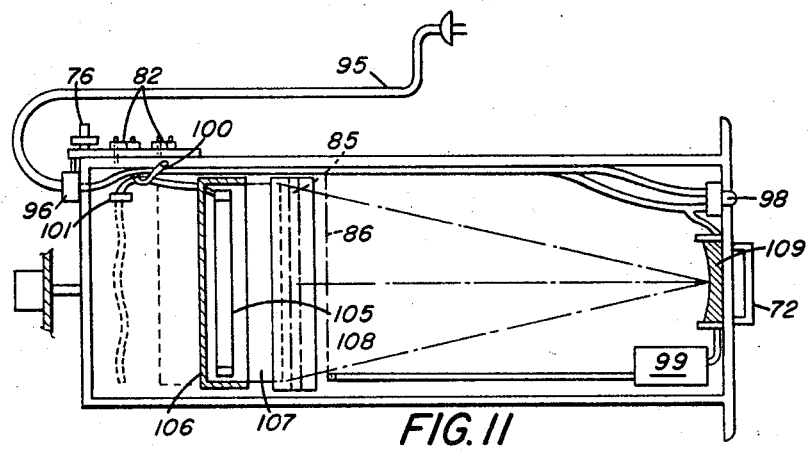
Figure 12:
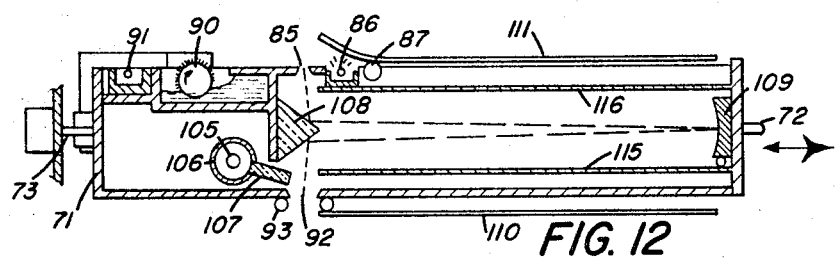

FIGS. 11 and 12 are respectively a horizontal section and a vertical section of the sliding unit or drawer of the embodiment shown in FIGS. 6 through 9.

Figure 13:
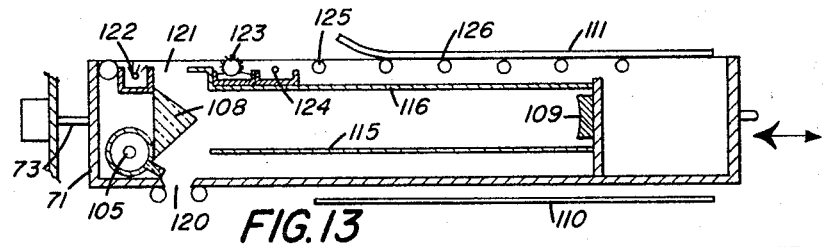
Figure 14:
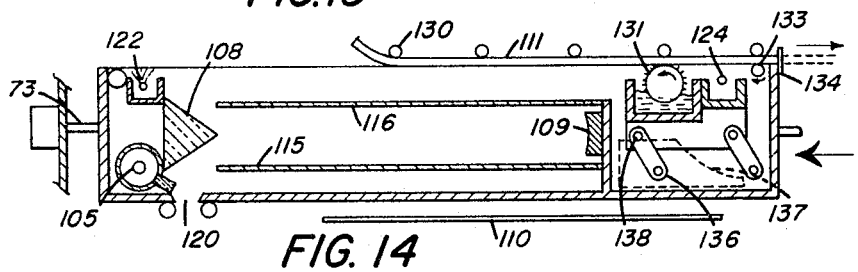

FIGS. 13 and 14 are similar vertical sections of the drawer in alternative embodiments of the invention.

Figure 15:
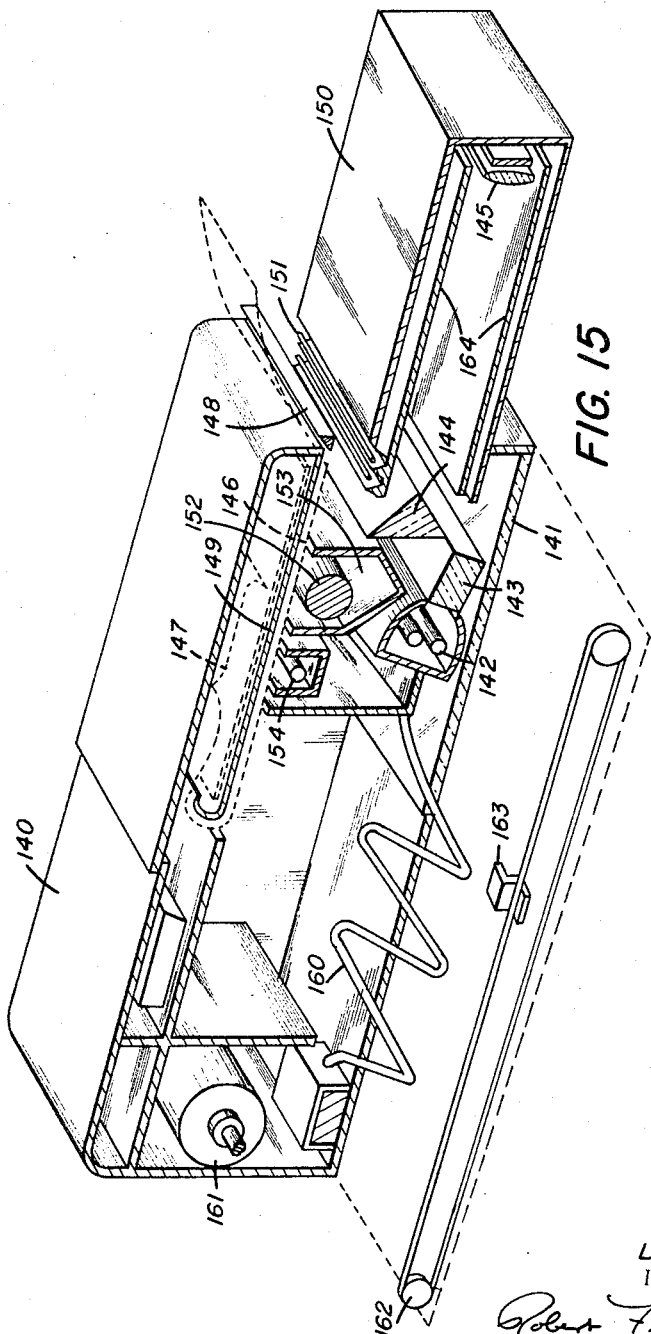
Figure 16:
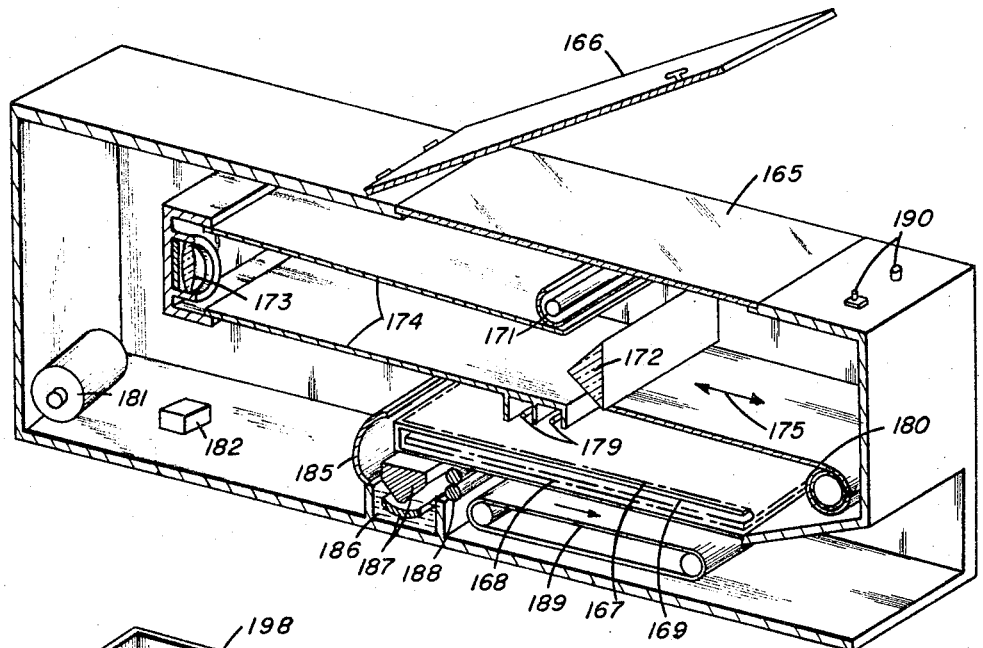
Figure 17:
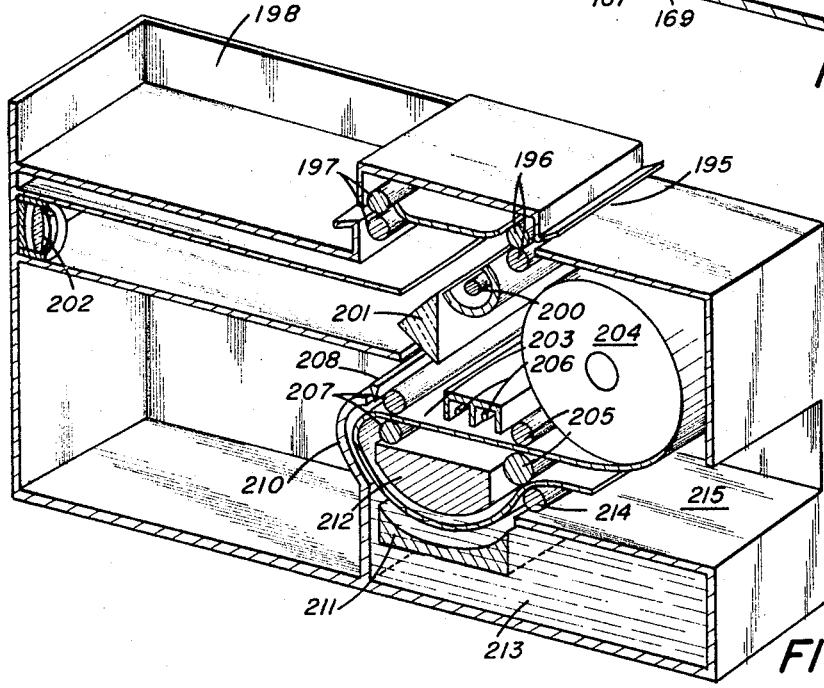

FIGS. 15, 16 and 17 illustrate three compact instruments incorporating different embodiments of the inventions.

The embodiments illustrated in FIGS. 6 to 11 do not necessarily incorporate the side mirrors (for high efficiency) shown in FIGS. 1 to 5.

Figure 1:
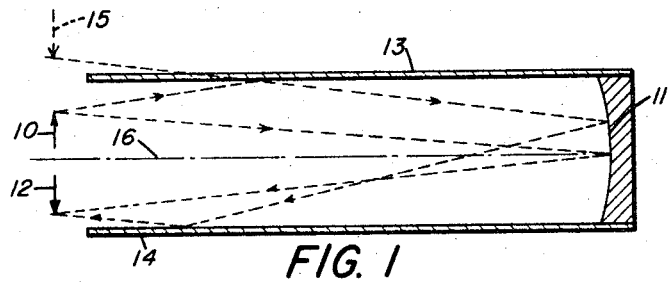
FIG. 1 is a schematic section of an optical system giving increased efficiency.

In FIG. 1, a beam of light from an object 10 is focused by reflecting means 11 to form an image 12 at unit magnification. The object and image are on opposite sides of the optic axis 16 of the focusing means 11. Plane mirrors 13 and 14 face each other parallel to the optic axis 16 and are spaced symmetrically with respect thereto. Light from the object 10 can go to either of these mirrors and such light after reflection by the focusing means 11 will strike the other mirror and be brought to focus at the image 12. The broken lines 15 indicate the virtual image of the object 10 as seen in the reflector 13.

Figure 2:
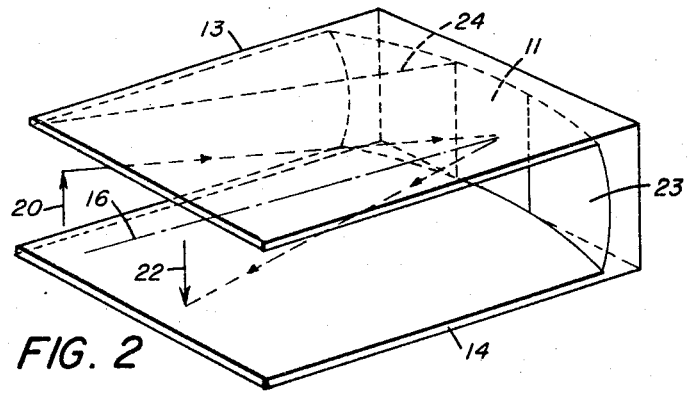
FIG. 2 is a perspective view of such a system.

In FIG. 2 the same optical system is shown with the object 20 and image 22 again on opposite sides of the optic axis 16, but in this case the displacement is more horizontal than vertical. The displacement can be in any direction. The reflector 11 normally occupies only the axial part of the system but could be extended as indicated at 23. Similarly the reflectors 13 and 14 need not extend beyond the useful area and could be cut off along the line 24 for example.

Figure 3:
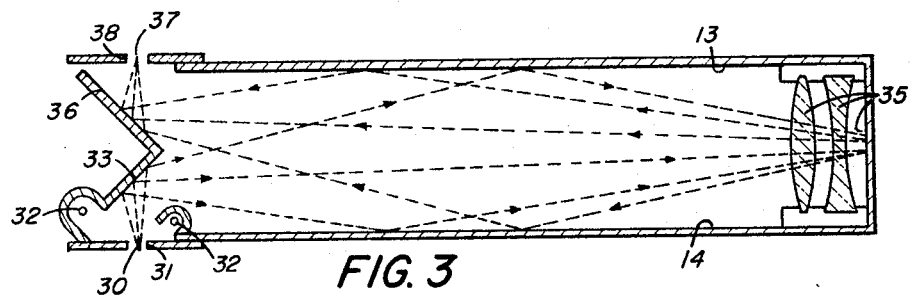
FIG. 3 shows a similar system in which the object and image are in parallel horizontal planes.

In the preferred embodiments shown in FIG. 3, the object 30 (usually a narrow band across a document lying horizontally) is located adjacent to an illuminated gate 31. Illumination is provided by lamps 32 "inside" the gate. Light from the object 30 is reflected by one face 33 of a dihedral reflector either directly to the reflecting focusing means 35 or via one or other of the plane mirrors 13 and 14. This light is then reflected to the other face 36 of the dihedral reflector and thence into focus to form an image 37 at an image gate 38. Various rays are traced to show that each ray suffers an odd number of reflections, thus providing a right-reading copy. A ray going directly from the reflector 33 to the focusing means 35 is reflected directly to the reflector 36 and thus suffers three reflections. Any ray going to one of the plane reflectors 13 or 14 before striking the reflecting focusing means 35, strikes the other plane reflector afterwards, making a total of five reflections.

Figure 4:
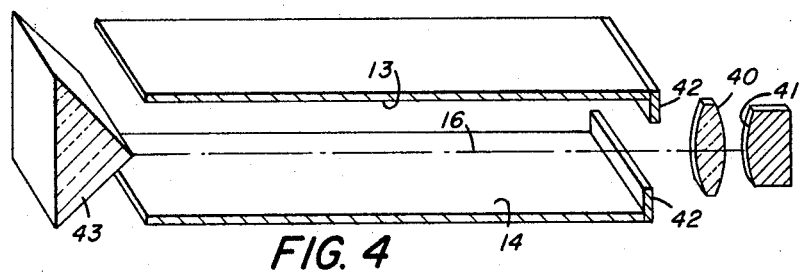
FIG. 4 is a perspective view of a different embodiment from that shown in FIG. 3.

FIG. 4 is a perspective view of a vertical section of an embodiment very similar to that shown in FIG. 3. In this embodiment the reflecting focusing object is made up of a positive lens 40 and a convex reflecting surface 41 which combine to operate much like a Cooke triplet lens. However precision systems requiring correction of color which is produced by the single positive lens have additional elements. A negative lens with a concave reflector has also been found satisfactory. Masks 42 aid in eliminating stray light and any light which suffers more than one reflection at each of the mirrors 13 and 14. The dihedral reflector in this embodiment is a right-angle prism 43.

Such an optical system is useful in continuous copying as shown in FIG. 5. A document 50 to be copied is moved over a roller 51 and through an object gate where it is illuminated by lamps 52. Light from the object at this point is received by the mirror 53 and reflected into focus via the reflecting objective 40, 41 and the reflector 55 onto the surface of a receiving sheet 56. In this embodiment the receiving sheet is a xerographic photoconductive sheet and is rendered sensitive by electrostatic charging, for example by a corona discharge wire 58. The sensitive sheet moves over a roller 57 and through the image gate synchronously with the movement of the document 50 through the object gate. Immediately following the image-wise exposure of the sheet 56 it passes under a magnetic brush developing unit 59 which applies a toner from a bin 60 to the surface of the sheet. The sheet then passes over high intensity infrared heaters 61 which fuse the toner image to the sheet 56 in the usual way.

Since the document and the receiving sheet are parallel to each other and move synchronously through the objective and image gates, it is possible to arrange an equivalent system in which the document and sheet are held fixed and the optical system is moved between them. The relative motion is the same in both cases. The moving optical system with fixed document and sheet constitutes a main feature of the present invention.

FIGS. 6–12 are different views of the same embodiment of the invention and the same reference numerals in the various figures refer to the same item. In this embodiment the relative motion of the optical system and the document is provided by having the document fixed relative to the housing of the instrument and having the optical system in a drawer which can move back and forth in the housing.

The main housing 60 is hinged by hinges 62 to a base 61 and can be tilted by a handle 63 to permit placing of a document on the base. Various arrangements can be used for placing and holding the document in the object plane and fixed relative to the housing 10, at least at the point where the object gate passes over it.

A cover or door 64 hinged to the housing 60 by hinges 65 may be opened by handle 66 to allow insertion of an image receiving sheet facing downwards and parallel to the document. Separate sheets may be used or a stack of sheets may be provided from which one is drawn directly into the image plane. However, in the arrangement shown a roll of xerographic paper is supplied in a container 67 and is drawn out of this container over a roller 87 so that it lies either loosely or flat substantially in the image plane. It is necessary that the image receiving sheet be accurately in the image plane as it passes over the image gate but prior thereto may be merely resting in the space provided. Preferably the sheet is drawn out the full length of the image plane and is held at the outer end between the door 64 and the front edge of the housing.

In this particular embodiment, charging, exposing, toning and fusing all takes place during the outward movement of a drawer 71 slidably mounted in housing 60. This movement can be provided simply by pulling on the handle 72 which pulls the drawer outward (to the right in FIGS. 6–8) against the force of a recoil cord 73 similar to those used with electric cords on movable electrical appliances. The recoil cord 73 merely provides the restoring force required and does not carry electric current in this embodiment. It is preferable, however, to have the exposure applied uniformly every time and in the embodiment shown a synchronous motor 75 through a suitable gear train in a housing 74 turns a pinion 76 which rolls along a rack 77. The rack extends the full length of the housing, but for clarity, only a few of the teeth are illustrated. As the pinion 76 turns, the drawer 71 moves out. The axle of the pinion 76 extends beyond the rack 77 into a guide groove 78 which holds the housing 74 up as the drawer moves out. As the end of the path is reached, the pinion 76 moves down the groove 79 and out of contact with the rack 77. Since there is now no outward force on the drawer, it moves fairly rapidly inward with the pinion 76 axle moving along the groove 80 until just before the drawer is completely closed, at which point the axle moves up, lifting a pivoted member 81, and into the inner end of the groove 78 ready for the next cycle, as the member 81 falls back in place.

Parallel links 82 support the housing 74 to insure that the up and down motion is parallel at all times.

The document lying on the base 61 is held in place during exposure by narrow rollers 93 pressing thereon. It receives light through the object gate 92 from a lamp 105 in a housing 106, which lamp sends light edgewise through a transparent light-guiding plate 107 directly to the object gate. This light is then reflected by the lower face of a dihedral reflector 108 to a concave mirror 109, either directly or via the plane parallel reflectors 115 and 116.

It should be noted that the sheets 115 and 116 may either be black baffles or highly polished mirrors. The simplest form of the present invention has these as black baffles, but the combination with the efficient optical system of the above-mentioned co-filed application requires these sheets to be plane reflectors. The light is then reflected by the upper surface of the dihedral 108 into focus at the image gate 85 as it moves along the image receiving sheet 11.

This embodiment of the invention includes a corona discharge wire 86 located immediately ahead of the image gate 85 during the exposure cycle. After exposure at the image gate 85, a magnetic toner brush 90 comes in contact with the sensitive sheet 111. This is followed by the high intensity infrared heater 91. Thus, after the document and receiving sheets are in place, withdrawal of the drawer 71 at a uniform rate, charges the sheet, exposes it to a right-reading image to the document, tones the exposed sheet and fuses the toner to the sheet. The toner station is then rendered inoperative (by moving away from the sheet). Also in the preferred arrangement the light 105 and the corona wire 86 are both turned off during the return of the drawer to its closed position. In general the fusing source 91 is also turned off although there would be no harm in additional fusing during the drawer closing cycle. Current for the whole system is brought into the drawer via a cable 95 extending through the housing 60. This cable is shown broken away in several places in FIG. 7. It extends to a switch 96 operated by a lug 97 on the movable housing 74. That is, the switch 96 is closed when the housing 74 is up and is open when the housing 74 moves down as the pinion 76 reaches the downward slope 79 of its guide track. Current for the various units also passes through a self-energizing switch 98 on the front of the drawer. As this switch is pressed while the switch 96 is open, nothing happens and the switch 98 springs back to the open position. However if it is pressed while the switch 96 is closed, current passes through a solenoid holding the switch 98 closed until the switch 96 is opened.

Thus current is supplied simultaneously to the lamp 90, the motor 75, the infrared heater 91 and the high voltage generator 99 made up of a transformer and rectifier which provides high voltage to the corona wire 86. It will be noted that there is plenty of room in the drawer immediately adjacent to the reflecting object 109 and on either side of it. The switch 98 with its solenoid and the high voltage generator 99 are located in these available areas. They do not interfere with the light passing through the optical system.

In this arrangement the rotating magnetic brush 90 is driven by the motor 75 which is the same motor which drives the pinion 76. It is of course possible to eliminate the motors and to have the drawer pulled out by hand with a rack and pinion coupling to rotate the magnetic brush 90. However, current is required for the light source and the corona discharge anyway and it is easier to insure uniform motion of the drawer by having it driven by the synchronous motor 75.

In the embodiment just described the charging, exposing, toning and fusing all occur during the outward motion of the drawer. Various other alternatives are possible. The charging could take place during the outward motion and then the developing and fusing during the closing motion. Or all could take place during the closing motion as discussed below in connection with FIG. 13. This has the advantage that the drawer is closed at the moment the finished copy is ready. In the supply roll arrangements shown in FIGS. 6–12 and also in FIG. 13, a knife 68 is provided to cut off the sheet from the supply roll immediately before or after exposing and toning. Still another embodiment provides for charging and exposing during the closing movement of the drawer and then, after the drawer is fully closed, the toning and fusing stations are brought into operative position and the sensitive sheet is moved across these stations before being cut off from the supply roll, all as illustrated in FIG. 14 and discussed below.

In FIG. 13 the object gate 120 is somewhat nearer the back of the drawer 71 than is the case in FIG. 12. Similarly the light source 105 is nearer the back. The light from the object is reflected by the dihedral 108 brought into focus as before at an image gate 121. The drawer is drawn out to its full length and then allowed to close at a uniform rate under the action of the recoil cord 73. A corona discharge wire 122 moves across the sheet 111 and then the sheet is exposed at the image gate 121, as the drawer closes. The sheet is then toned by a magnetic brush 123 and fused by a radiant heater 124. At this point there is no harm in allowing the sheet to touch roller bearings such as 125 and 126 carried by the drawer.

Still another embodiment is shown in FIG. 14 which is similar in many ways to the embodiment shown in FIG. 13. However in this case the document is held upward against rollers 130 until the drawer is fully closed. At this point a pivot pin 138 rides up a cam 137, carrying a magnetic toning brush 131 up to a position effectively in contact with the exposed sheet. Parallel motion is assured by linkages 136.

When the developing and fusing stations are in place, a roller 133 is turned moving the sheet 111 across the toner and fusing stations and outward from the apparatus. When the end of the exposed area has been reached, this motion is stopped, the sheet is cut off from the supply by a knife 134 on the top of the drawer and a new sheet is in position for making another copy. The toner and fusing stations are shown unduly spread out in FIG. 14 but are in practice held quite close together particularly in this embodiment shown in FIG. 14.

One very satisfactory embodiment of the invention is illustrated in FIG. 15 which shows the essential optical and mechanical parts schematically. In the closed position, this apparatus is about 22 inches long, 8 inches high and 10 inches wide. A vertical section through the middle of the apparatus, i.e., along the optic axis of the mirror and lens system, is shown schematically. In this arrangement the apparatus housing 140 includes a glass plate 141 against which the document to be copied is held. Actually the apparatus rests on the document. Spring urged legs under one end allow it to be tilted easily for insertion or removal of the document. Light from lamps 142 through a solid transparent bar 143 illuminates a strip of the document and the light is reflected therefrom to the lower surface of a right angle prism 144. This light is then reflected as described in connection with the other figures to a reflection lens 143 which focuses the light and reflects it via the upper surface of the prism 144 to form a light image on the under surface of a sensitive sheet shown by broken lines 146. The instrument preferably, but not necessarily, has the efficiency producing mirrors 164 parallel to the axis of the lens 145.

In this particular instrument the supply of sensitive material, as shown at 147 is in the form of a fanfold. In the exposure area, the material is held at both ends for convenience, but this is not an essential part of the instrument since the electrostatic forces tend to hold the sensitive material tightly against a backing plate 149 throughout the exposure period. After exposure has been completed and the drawer 150 closed as discussed below, the exposed and toned photoconductive paper 146 is withdrawn manually and cut off (torn off) against a sharp knife edge 148.

The charging, exposing, toning and fusing all take place during the outward movement of the drawer 150. That is, after the instrument and the sensitive sheet 146 are in place with the drawer closed, a motor 161 through a drive mechanism illustrated schematically at 162 drives the drawer 150 outward. The point of engagement of the drawer to the drive chain is shown at 163. As the drawer 150 moves out, corona wires 151 charge the photoconductive paper 146 which is then exposed imagewise. A magnetic brush 152 applies toner 153 in the usual way to this toned image and then an infrared heating lamp 154 fuses the toner to the photoconductive sheet 146. In this particular instrument, the electrical current and potential for the lamps 142, the corona wires 151, the small motor, not shown, for driving the magnetic brush 152 and for the fusing lamp 154 are all supplied through an extensible preformed cable 160. The cable is zig-zag and flat in its pre-formed state, but a helical cord such as used on telephones would serve as well.

Another very compact apparatus is shown in FIG. 16. In this apparatus the moving optical system stays within the outer housing at all times and hence the total length of the apparatus is a little greater than that of FIG. 15 to cover the same size document. This apparatus (FIG. 16) permits the document to be copied to be placed on the top and has the final print emerge from a large opening in the lower front of the instrument. The operation is as follows. A document, not shown, is laid on a plate glass 165 and held flat by a hinged cover 166. The sensitive sheet shown by broken lines 167 is brought from a supply chamber 168 into the exposure plane before the exposing operation begins. It is then held flat against the backing plate 169 by electrostatic forces. It remains in this position during charging and exposing. Then, during a subsequent step, it is moved through a liquid toning bath as discussed below, dried and cut off.

Light from a lamp 171 illuminates the document lying on the glass plate 165 and the light reflected therefrom is reflected by the upper surface of a prism 172 and focused by a reflecting lens 173 onto the surface of the sensitive sheet 167, after reflection from the lower surface of the prism 172. The optical system including the lamp 171, the prism 172, the lens 173 and the efficiency increasing mirrors 174, moves back and forth as indicated by the double-headed arrow 175. It starts at the right end of its path in FIG. 16 and as the system moves to the left, the photosensitive sheet 167 is charged by corona wires 179. The sheet 167 is then exposed as described above, the exposure being complete when the moving system reaches the left end of its path. To prevent light from the document passing behind the prism 172 and reaching the sensitive sheet 167, a light shield 180 in the form of a roller blind, unrolls and rolls up, as is also indicated by the double-headed arrow 175. The motor drive mechanism 181 and the electrical parts of the system are located to the rear of the instrument, i.e., to the left in the arrangement shown. These are indicated schematically.

After charging and exposure are complete, the sensitive sheet is driven by means, not shown, to the left end and is guided by an arcuate guide member 185 into a liquid toning bath 186 where it passes between guides 187. Such liquid toning systems are well known in xerography. The sheet then passes between rollers 188 onto a moving belt 189 which helps to dry the sheet and to move it out of the box. As the trailing end of the exposed sheet reaches the arcuate guide 185, a suitable knife moves across cutting it off and leaving the next area in position for the next exposure. The cutting knife is not shown. The upper roller of the drive rollers 188 is preferably of rubber and engages the back of the toned sheet. The lower roller of this pair is preferably of steel. The controls 190 for the system are conveniently mounted on the top near the front of the instrument, but the connections are not shown in this figure which is intended merely to show a preferred compact arrangement of mechanical and optical parts which have proven quite satisfactory.

Still another arrangement which has proven to be quite satisfactory is shown in schematic perspective in FIG. 17. It is similar to FIG. 5 discussed above in that the optical system is held stationary and the document and sensitive sheet are moved synchronously past the exposing guides, i.e., past the object and image gates. In this arrangement, a document (not shown) to be copied is fed face down through a slit 195 between drive rollers 196 and 197, which move the document through the object gate. An open compartment 198 is provided to receive and store temporarily a number of documents after they have been exposed.

As the document passes through the object gate, light from a lamp 200 illuminates the under surface of the document. Light is reflected therefrom via the upper surface of a prism 201 to a focusing reflecting lens 202. The light then passes to the lower surface of the prism 201 and thence to expose a corresponding area of a strip of sensitive photoconductive material 203 which is moving synchronously with the image of the document through the image gate. The sensitive photoconductive material comprises zinc oxide in resin on a paper base and comes from a supply roll 204 between drive rollers 205 and under corona charging wires 206 before it reaches the image gate. It is then driven by rollers 207 under a cutting knife 208. A guide member 210 guides the exposed material between guides 211 and 212 through a liquid toning bath 213. It is then driven by a steel roller 214 between this roller and the lower rubber roller 205 into the copy receiving space 215. After all of the exposed material has reached the guide 210, the cutting knife 208 operates to cut off the exposed part of the material and development thereof is continued. As before, the drive mechanism and electric supply units would be located in the lower rear of the instrument, but are not shown in this drawing.

In both FIGS. 16 and 17 the supply of sensitive material (a fanfold in one case and a roll in the other) is inserted into the instrument through a door (not shown) in the side of the housing.

Having thus described various embodiments of my invention, I wish to point out that it is not limited thereto but is of the scope of the appended claims.

I claim:
1. A printer for use with a xerographic photoconductive image receiving sheet comprising:
   a housing;
   means in said housing for holding a flat object and said image receiving sheet in substantially parallel object and image planes facing each other;
   a drawer in said housing reciprocally movable in a path between and parallel to said planes;
   means carried by said drawer for defining elongated object and image gates transverse to said path and respectively adjacent said object and image planes;
   said gates being positioned to simultaneously sweep across said object and a corresponding area of said receiving sheet upon movement of said drawer along said path;
   an optical system carried by said drawer for illuminating said object at said object gate and for forming a right-reading image of said object at said image gate;
   means carried by said drawer on one side of the image gate for uniformly charging said receiving sheet;
   means carried by said drawer on the other side of the image gate for applying toner to the exposed receiving sheet as said drawer is moved in one direction along said path;
   means for moving said drawer uniformly in said one direction with said illumination means, said charging means and said toner applying means being operative;
   means for rendering said charging means and said toner applying means inoperative when said drawer reaches the end of said path; and
   means for returning said drawer to the other end of said path.

2. A printer in accordance with claim 1 including means for moving said toner applying means away from said receiving sheet and for holding said toner applying means in such position during movement of said drawer to the other end of said path.

3. An efficient optical system comprising:
   reflecting focusing means for receiving a beam of light from an object optically to one side of the optical axis of said focusing means and for forming a real image of said object at unit magnification symmetrically on the other side of said optical axis;
   two plane reflectors parallel to, symmetrically spaced from and facing said optical axis for receiving additional beams of light from said object to reflect them once before and once after striking said reflecting focusing means to direct said additional beams of light into focus register with said image;
   means for defining elongated object and image gates respectively adjacent said object and image; and a dihedral reflector between said object and image with its dihedral edge intersecting said optical axis and parallel to said reflectors for receiving a beam of light from said object through said object gate on one face of said dihedral reflector and reflecting it into the combination of parallel plane reflectors and reflecting focusing means which reflect it to the other face of the dihedral reflector and thence through the image gate to said image.

4. A system according to claim 3 including means for supporting a document at the object gate, means for supporting an image receiving sheet at said image gate, and means for providing relative movement between said optical system and said two supporting means to cause said gates to synchronously scan said document and receiving sheet.

5. A system according to claim 4 including a housing, and a drawer in said housing, said supporting means being carried by said housing for holding said document and receiving sheet fixed relative to said housing and said reflecting focusing means, plane mirrors, dihedral reflector, and said object and image gate defining means being carried by said drawer for movement back and forth therewith and relative to said document and receiving sheet supporting means.

6. A system according to claim 5 including means mounted in said drawer adjacent said gate for substantially uniformly electrostatically charging the surface of said receiving sheet.

7. A system according to claim 5 including means carried by said drawer for applying toner to a charged and exposed receiving sheet during movement of said drawer relative to said receiving sheet.

References Cited

UNITED STATES PATENTS

| | | | |
|---|---|---|---|
| 1,332,139 | 2/1920 | Nichols | 240—41.35 |
| 3,260,154 | 6/1966 | Tchejeyan et al. | 88—24 |
| 3,286,588 | 12/1966 | Wick et al. | 88—24 |
| 3,364,816 | 1/1968 | Jeffree | 88—24 |

NORTON ANSHER, *Primary Examiner.*

W. A. SIVERTSON, *Assistant Examiner.*

U.S. Cl. X.R.

350—96, 202; 355—66